Dec. 12, 1967 M. ORAIN 3,357,207
UNIVERSAL BALL JOINT
Filed Feb. 10, 1966 2 Sheets-Sheet 1

Inventor:
Michel Orain
By Baldwin & Wight
Attorneys

Dec. 12, 1967     M. ORAIN     3,357,207
UNIVERSAL BALL JOINT
Filed Feb. 10, 1966     2 Sheets-Sheet 2

Inventor:
Michel Orain
BY Baldwin & Wight
Attorneys

United States Patent Office 3,357,207
Patented Dec. 12, 1967

3,357,207
UNIVERSAL BALL JOINT
Michel Orain, Courbevoie, Hauts-de-Seine, France, assignor to Societe Glaenzer Spicer Societe Anonyme, Yvelines, France
Filed Feb. 10, 1966, Ser. No. 526,592
Claims priority, application France, Mar. 10, 1965, 8,668
14 Claims. (Cl. 64—8)

ABSTRACT OF THE DISCLOSURE

This invention relates to a universal ball joint having a barrel internally receiving a boss having convex flanks with the boss and barrel defining therebetween a plurality of trackways in each of which is housed a ball. A pair of washers have first and second spherical surfaces for respectively contacting an inner surface of the barrel and the convex flanks. At least one of the washers is longitudinally unconfined and free for sliding movement relative to the barrel, and the washers are preferably constructed from relatively resilient stamped sheet metal. One of the washers may be fixed to the barrel to prevent relative sliding movement therebetween, and the contacting surfaces of the barrel and unconfined washer are asymmetrically contoured.

---

The present invention relates to an axially fixed or sliding universal ball joint. Joints are already known which comprise: A boss provided on the outside with a plurality of running tracks of substantially semi-circular section and of rectilinear axis, said boss being integral with one of the shafts; a barrel provided on the inside with the same number of running tracks, of the same sectional shape and of rectilinear axis, this barrel being integral with the driven shaft; balls rolling and sliding between the running tracks in the boss and the barrel, at the rate of one ball per running track; and a cage holding the centres of the balls in the same plane.

The operation of such joints is conditional upon the said plane passing through the centres of the balls meeting the intersection of the longitudinal axes of the boss and barrel. In order to achieve this, various means are utilised, but they all entail disadvantages.

In numerous versions, a cage is held in the bisector plane by the balls themselves. In this case it is possible to admit, in a simplified manner, that at a given moment only a part of the balls will transmit the torque and tend to remove the cage from the bisector plane, while the other part of the balls holds the cage in the bisector plane by giving a reaction on the running tracks concerned, which tends to increase the torque to be transmitted by the first balls and therefore to overload them.

In other versions, the running tracks being crossed through their construction, the balls simultaneously carry out the functions of torque transmitter and cage guiding means, the predominance of one of these functions being the more pronounced, the larger the angle between the two shafts to be connected.

In all cases of operation at an angle, the maintenance of the cage in the bisector plane by the balls themselves leads to a great cyclic variation of the load borne by each of these balls. The result is that the actual maximum load carried by each ball in succession may be of the order of three times the load obtained by dividing the total force by the number of balls (as is in the case with a Rzeppa joint).

An object of the present invention is to provide an axially fixed or sliding universal ball joint which overcomes at least some of the above mentioned disadvantages of existing joints while offering great simplicity of manufacture and increased load capacity.

The joint forming the subject of the invention comprises in known manner a boss integral with a transmission shaft and provided on the outside with a plurality of rectilinear running tracks which are substantially semi-circular and parallel to the axis of said shaft; a cylindrical barrel integral with the driven shaft and provided on the inside with the same number of rectilinear running tracks of the same section as those of said boss, and balls rolling and sliding between the running tracks in said boss and in said barrel, at the rate of one ball per running track; said joint being remarkable in that said balls are held in said running tracks by two washers of concave shape which are placed in contact on each side of the ring of balls and of the boss having convex flanks, each of said washers having two operative spherical surfaces, one of which is situated at its periphery and centred in the bore in the barrel or in any corresponding surface, and the other being situated laterally, said washers being held in contact with the balls and the flanks of the boss by any conventional, preferably elastic means.

Some embodiments of the invention will now be described hereinbelow with reference to the accompanying drawings, in which.

Figure 1:
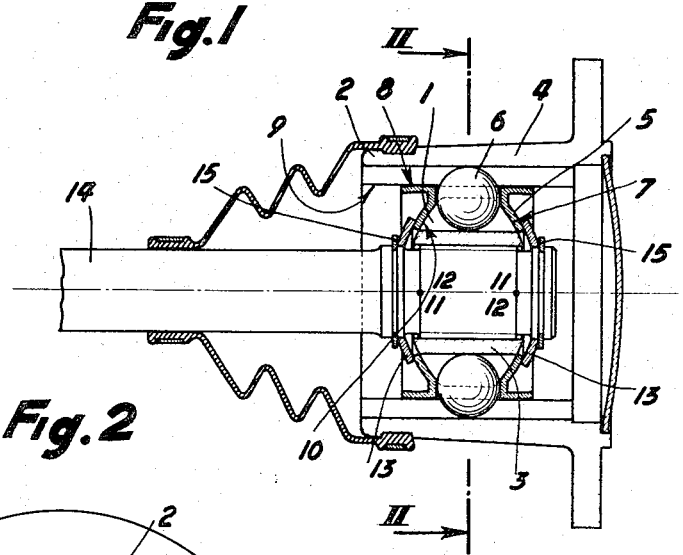
FIG. 1 shows a first form of construction of the joint, viewed in longitudinal section.
Figure 2:
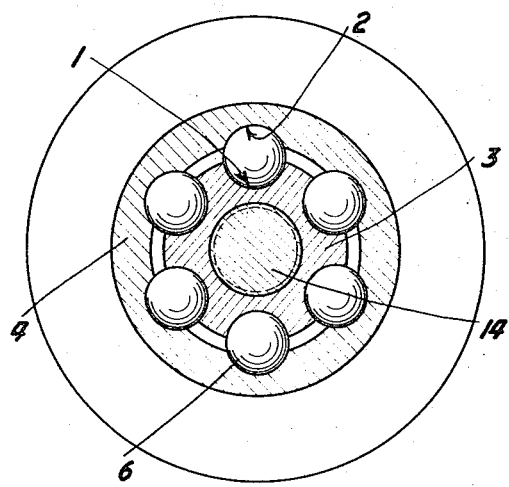
FIG. 2 is a section along the line II—II in FIGURE 1.

In the form of construction illustrated in FIGURES 1 and 2 the joint comprises a plurality of running tracks 1 and 2, formed respectively on the boss 3 and in the barrel 4, the tracks being parallel to the axes of the boss 3 and barrel 4 respectively. A conventional cage is not provided in this joint and is replaced by two generally concave washers 5 which are placed in contact and on each side of the ring formed by the balls 6 and of the boss 3, the convex flanks 7 of which have a radius of curvature substantially equal to that of the concavity of the washers 5.

Each of said washers 5 has two operative spherical surfaces, one of which is situated on its periphery 8 and centred in the bore 9 in the barrel 4, or in any corresponding surface, the other (10) being situated inside the washer and in contact with the curved flank 7 of the boss 3.

These two washers 5 are so shaped that for each of them the centre 11 of the outer spherical surface 8 and the centre 12 of the lateral or interior spherical surface 10 are situated symmetrically in relation to the plane containing the centres of the balls 6. As a result, the centres 11 and 12 are identical on each side of this plane when the joint is equal to a zero angle, if the washers 5 are identical.

Means are utilised to hold the two washers 5 in contact with the balls 6 and with the flanks 7 of the boss 3. In the example illustrated these means are constituted by elastic washers 13 of the so-called Belleville type, which are fastened on the driving shaft 11 by elastic rings 15.

Figure 3:
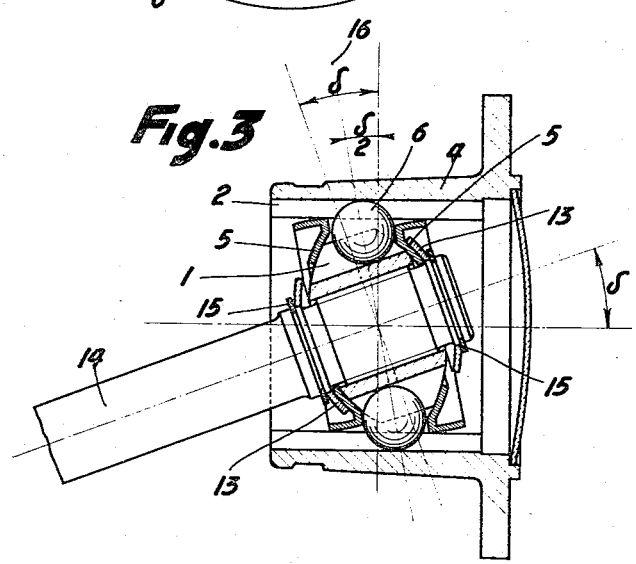
FIG. 3 shows the joint in operation, viewed in longitudinal section.

The barrel 4 is solid to the driven shaft (not illustrated). Whatever the value of the working angle δ (FIGURE 3) the shaped washers 5 are inclined by an angle δ/2, as may be verified by a simple geometrical demonstration, and hold the balls together in the bisector plane 16 of the shafts to be connected.

The bisector plane being obtained without the aid of the balls, several advantages are gained:

(a) As the balls have only to effect the transmission of torque between the boss and the barrel, they bear constant, equal loads, so that there is an increase of life and capacity as compared with known joints;

(b) Any number of balls may be used;

(c) The shaped washers used in the present description are bodies of revolution and may even be shaped by drawing, whereas the cages used in known joints are always complicated and their production requires accurate machining;

(d) The running tracks are rectilinear and parallel to the axis of the barrels and of the boss, thus permitting rapid machining, for example in a single broaching pass. This design moreover constitutes the most advantageous solution from the point of torque transmission capacity, since they are rectilinear grooves parallel to the axis, which enable balls of maximum diameter to be accommodated, all other conditions being the same;

(e) The absence of cages between the boss and the barrel makes it possible to increase the envelopment angle of the running tracks around the balls and therefore to increase capacity.

The result is that the joint forming the object of the invention offers greater capacity at a lower cost price as compared with known joints. Modifications of shape and of details may obviously be made to it without departing from the spirit of the invention.

Figure 4:
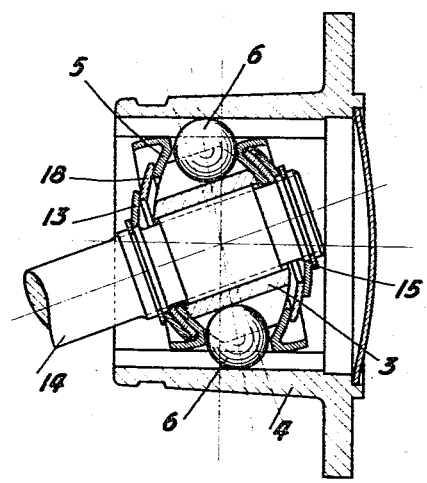
FIG. 4 shows a second form of construction of the joint, viewed in longitudinal section.

Thus in an alternative illustrated in FIGURE 4 the joint contains a washer 18 intended to prevent gaping between the washers 5 and 13. Better continuity of support and guidance is thus obtained at a wide angle for the washers 5.

Figure 5:
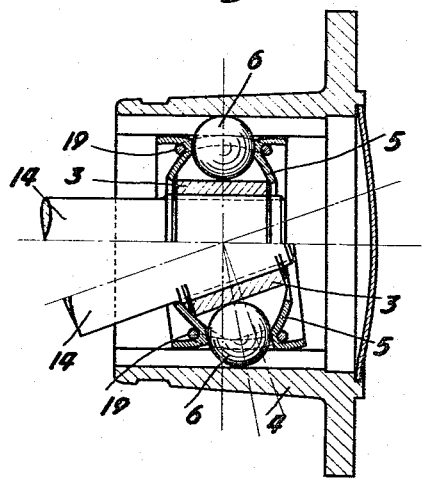
FIG. 5 illustrates an alternative form of the means of retaining the washers supporting the balls.

FIGURE 5 illustrates another means of holding the washers 5 in contact with the boss 3 and the balls 16, said means comprising a spring wire 19 connecting the two washers 5 by passing in the free spaces defined by two adjoining balls and the boss 3 and the barrel 2; this figure shows the shaft 14 in two different positions.

Figure 6:
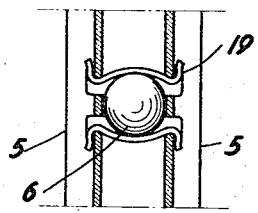
FIGS. 6 and 7 are sectional views through means for retaining the washers supporting the balls, and show other alternatives for said means.
Figure 7:
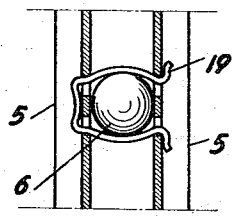

FIGURES 6 and 7 illustrate other similar forms of construction of the means 19 shown in FIGURE 5 for holding the washers 5 in contact with the boss 3 and the balls 6. In FIGURE 6, two separature spring wires are used, whereas in FIGURE 7, a simple V-shaped spring wire is used.

Figure 8:
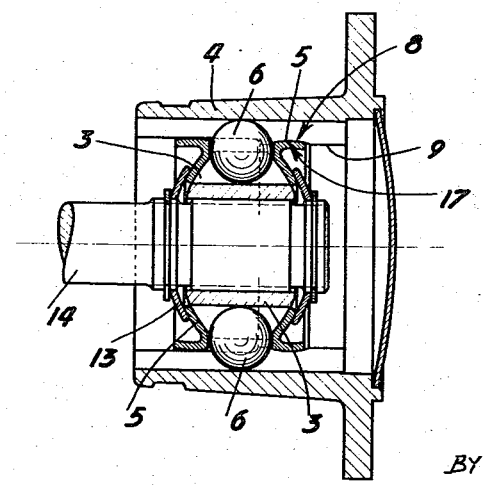
FIG. 8 illustrates another form of construction of the joint.

FIGURE 8 illustrates another form of construction of the joint. In this form the joint is fixed axially and for this purpose the bore 9 has a spherical zone inside which the washer 5 is articulated on its outer spherical zone 8. The inside boss 3 is thus unable to slide in the barrel 4, the only relative movement of the two shafts being then an angular displacement.

It will be understood that although the various embodiments shown in the accompanying drawings have been described separately, the various parts of each embodiment are interchangeable. For example, the means 19 shown in FIGURES 5, 6, and 7 could be used in place of the parts 13 and 15 shown in FIGURES 1–3.

What is claimed is:

1. An axially fixed universal ball joint arranged between a driven shaft and a driving shaft, comprising: a boss integral with said driving shaft, convex flanks provided on said boss, a plurality of running tracks provided externally on said boss, said running tracks having a substantially semi-circular cross-section and being parallel to the longitudinal axis of said shaft; a cylindrical barrel integral with said driven shaft, a plurality of running tracks, equal in number to and having the same cross-section as, the said plurality of tracks on said boss, provided internally on said barrel, to form a plurality of pairs of ball trackways, a ball arranged for rolling and sliding movement in each said trackway, means to hold said balls in said trackways, said means comprising a first concave washer arranged on one side of and adapted to contact the set of balls and one of said flanks and a second concave washer arranged on the other side of and adapted to contact the set of balls and the other of said flanks, a spherical zone provided in the bore of said barrel, a first operative spherical surface situated on the periphery of said first washer and having its centre in the bore of the barrel and a first operative spherical surface situated on the periphery of said second washer and having its centre in the bore of the barrel, located in the said spherical zone provided in the bore of said barrel, and a second operative spherical surface situated on that side of each washer in contact with said convex flank, and further washers located on said driving shaft for holding said concave washers in contact with the said balls and flanks, respectively.

2. An axially slidable universal ball joint arranged between a driven shaft and a driving shaft, comprising: a boss integral with one of said shafts and having convex flanks, a plurality of running tracks provided externally on said boss, said running tracks having a substantially semi-circular cross-section and being parallel to the longitudinal axis of said shaft; a cylindrical barrel integral with the other of said shafts, a plurality of running tracks, equal in number to, and having the same cross-section as, the said plurality of tracks on said boss, provided internally on said barrel to form a plurality of ball trackways, a ball arranged for rolling and sliding movement in each trackway, two concave washers to hold said balls in said trackways, one arranged on one side of and adapted to contact the set of balls and one of said flanks and the other arranged on the other side of and adapted to contact the set of balls and the other of said flanks, a first operative spherical surface situated on the periphery of each of said washers and having its centre in the bore of the barrel and a second operative spherical surface situated on the side each washer in contact with said convex flank, and a spring wire means connecting said washers and holding said washers in contact with the said balls and flanks, said spring wire means passing through free spaces defined by two adjoining balls and said boss and said barrel.

3. A universal ball joint adapted to be arranged between a driven shaft and a driving shaft comprising a boss having convex flanks, a plurality of running tracks provided externally on said boss, said running tracks being parallel to the longitudinal axis of said boss, a barrel having a longitudinal axis and an inner surface surrounding said boss, a plurality of running tracks provided internally of said barrel forming with said first mentioned running tracks a plurality of ball trackways, a ball arranged for rolling and sliding movement in each trackway, means to hold said balls in said trackways, said means comprising two washers one arranged on one side of and adapted to contact the set of balls and one of said flanks and the other arranged on the other side of and adapted to contact the set of balls and the other of said flanks, a first peripheral surface of each of said washers being in contact with said barrel inner surface and having its center in the bore of the barrel, a second spherical surface of each washer being in contact with each of said convex flanks, at least one of said washers being longitudinally unconfined relative to said barrel inner surface and free for sliding movement with respect to said barrel inner surface, and means holding said washers in contact with said balls and flanks.

4. The universal ball joint as defined in claim 3 including means for fixing the other of said washers relative to said barrel to prevent relative sliding movement therebetween.

5. The universal ball joint as defined in claim 3 wherein said washers are constructed from relatively resilient stamped sheet metal.

6. The universal ball joint as defined in claim 3 wherein said peripheral surface of said at least one washer and said barrel inner surface are asymmetrically contoured.

7. The universal ball joint as defined in claim 3 wherein said means holding said washers in contact with said balls and flanks comprise washers locked on an associated shaft and bearing against said first-mentioned washers remote from said flanks.

8. The universal ball joint as defined in claim 7 wherein said washers locked on said shaft are elastic, and all of said washers are of a concave configuration complementary to each other and to the convex configuration of said flanks.

9. The universal ball joint as defined in claim 8 including locking rings for securing said elastic washers on said shaft.

10. The universal ball joint as defined in claim 3 including a shaft associated with said boss, and lost-motion means disposed between each of said washers and said holding means for increasing the angular displacement between said barrels and boss axes.

11. The universal ball joint as defined in claim 3 including means for fixing the other of said washers relative to said barrel to prevent relative sliding movement therebetween, and said washers are constructed from relatively resilient stamped sheet metal.

12. The universal ball joint as defined in claim 3 wherein said peripheral surfaces are radially outwardly convexly curved, and said inner barrel surface is of a right-cylindrical configuration.

13. A universal ball joint comprising a boss having convex flanks, a plurality of running tracks provided externally on said boss, said running tracks being parallel to the longitudinal axis of said boss, a barrel having a longitudinal axis and an inner surface surrounding said boss, a plurality of running tracks provided internally of said barrel forming with said first-mentioned running tracks a plurality of ball trackways, a ball arranged for rolling and sliding movement in each trackway, means to hold said balls in said trackways, said means comprising two washers one arranged on one side of and adapted to contact the set of balls and one of said flanks and the other arranged on the other side of and adapted to contact the set of balls and the other of said flanks, a first peripheral surface of each of said washers being in contact with said barrel inner surface and having its center in the bore of the barrel and a second spherical surface of each of said washers being in contact with each of said convex flanks, means holding said washers in contact with said balls and flanks, and the peripheral surfaces of said washers and said barrel inner surface being asymmetrically contoured.

14. The universal ball joint as defined in claim 13 wherein said means holding said washers in contact with said balls and flanks comprise additional washers disposed outboard of an associated one of each of said first-mentioned washers and contoured in complementary configuration to the second spherical surfaces thereof.

References Cited

UNITED STATES PATENTS

| | | | |
|---|---|---|---|
| 2,150,942 | 3/1939 | Rzeppa | 64—21 |
| 2,150,952 | 3/1939 | Ward | 64—21 |
| 2,182,455 | 12/1939 | Smith | 64—7 |
| 2,313,279 | 3/1943 | Suczek | 64—7 X |
| 2,615,317 | 10/1952 | Rzeppa | 64—21 |
| 3,133,432 | 5/1964 | Mazziotti | 64—21 |
| 3,166,919 | 1/1965 | Kayser | 64—21 |

HALL C. COE, *Primary Examiner.*